US006297848B1

(12) United States Patent
Westerman (10) Patent No.: US 6,297,848 B1
(45) Date of Patent: Oct. 2, 2001

(54) LOW-DELAY CONVERSION OF 3:2 PULLDOWN VIDEO TO PROGRESSIVE FORMAT WITH FIELD AVERAGING

(75) Inventor: Larry A. Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/200,026

(22) Filed: Nov. 25, 1998

(51) Int. Cl.$^7$ .................................................. H04N 7/01
(52) U.S. Cl. ..................... 348/448; 348/459; 348/441; 348/911; 348/715
(58) Field of Search .................... 348/459, 448, 348/558, 911, 450, 453, 456, 441, 443, 449, 705, 715, 97, 103; H04N 7/01, 3/36

(56) References Cited

U.S. PATENT DOCUMENTS

| | | | |
|---|---|---|---|
| 4,876,596 | 10/1989 | Faroudja | 358/140 |
| 4,881,125 | 11/1989 | Krause | 358/141 |
| 4,982,280 | * 1/1991 | Lyon et al. | 358/105 |
| 5,177,615 | 1/1993 | Ozaki et al. | 358/214 |
| 5,221,966 | 6/1993 | Clayton et al. | 358/140 |
| 5,255,091 | 10/1993 | Lyon et al. | 358/140 |
| 5,446,497 | * 8/1995 | Keating et al. | 348/443 |
| 5,519,451 | * 5/1996 | Clatanoff et al. | 348/606 |
| 5,596,371 | 1/1997 | Pakhchyan et al. | 348/452 |
| 5,852,473 | * 12/1998 | Horne et al. | 348/558 |
| 5,872,600 | * 2/1999 | Suzuki | 348/459 |
| 6,157,412 | * 12/2000 | Westerman et al. | 348/558 |
| 6,201,577 | * 3/2001 | Swartz | 348/558 |

OTHER PUBLICATIONS

*Algorithmn for Interlace–to–Progressive Scan Conversion Intellectual Property Issues*, 8 pages (undated).

* cited by examiner

Primary Examiner—Reinhard J. Eisenzopf
Assistant Examiner—Jean W. Désir
(74) Attorney, Agent, or Firm—Marger Johnson & McCollom, P.C.

(57) ABSTRACT

A method and apparatus for low-delay conversion of 3:2 pulldown video to progressive format with field averaging is disclosed. The method considers 3:2 pulldown interlaced video that represents a four-frame motion picture film sequence as a ten-field interlaced video field sequence of three, two, three, two video fields per motion picture frame respectively for the four-frame sequence. One step of the method is the step of creating a ten-frame progressive video frame sequence, having a delay of approximately one field time with respect to the ten-field interlaced video sequence. This step is achieved by combining at one field time intervals a top field and a bottom field from the ten-field interlaced video sequence, where, at the time of combination, the top field and the bottom field are the most recently available top and bottom fields corresponding to the same motion picture film frame. The method comprises the further step of substituting, for the top field or the bottom field in the combining step, an average of that top or bottom field and the field two fields prior, when that top or bottom field and the field two fields prior correspond to the same motion picture film frame.

Apparatus for performing the above method includes a multiplexer that accepts an input video signal, a two-field-time delayed signal, and a signal that represents the average of these two. The multiplexer outputs a send field and a store field that meet the criteria described above. The send field and a one-field-time delayed version of the store field are combined to produce a progressive frame.

19 Claims, 11 Drawing Sheets

LOW-DELAY CONVERSION OF 3:2 PULLDOWN VIDEO TO PROGRESSIVE FORMAT WITH FIELD AVERAGING

FIELD OF THE INVENTION

This invention pertains generally to video format conversion, and more particularly to conversion of 3:2 pulldown interlace video to progressive format.

BACKGROUND OF THE INVENTION

Figure 1:
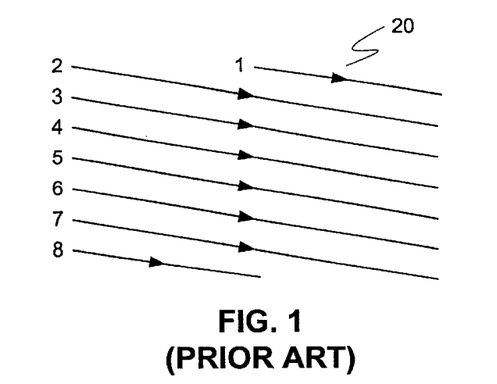
FIG. 1 illustrates a progressive video scan pattern.

Video imaging systems represent an input scene as a time-varying signal that can be transmitted or stored by electronic, magnetic, optical, or other means. Video is gathered as a succession of "still" frames representing the input scene, at a frame rate such that, when the frames are subsequently presented in rapid sequence to a human observer, motion appears fluid. FIG. 1 shows, with a great deal of simplification, one method of creating and replaying a video signal frame 20, known as progressive video. In this method, the video time signal represents the image intensity at a raster point scanning left to right, top to bottom across frame 20 at a constant rate, tracing out line pattern 1–8 during one frame time. At the end of this frame time, the point has imaged a frame, and it returns to the beginning of line 1 and begins a new frame.

Modern video imaging systems use a variety of "tricks" to minimize video bandwidth requirements while presenting acceptable picture quality. One trick that is used to reduce detectable screen flicker produced by raster scanning a cathode ray tube at a low frame rate is interlaced video. The current United Stated video standard, commonly referred to as NTSC (National Television System Committee) video, uses interlacing.

Figure 2:
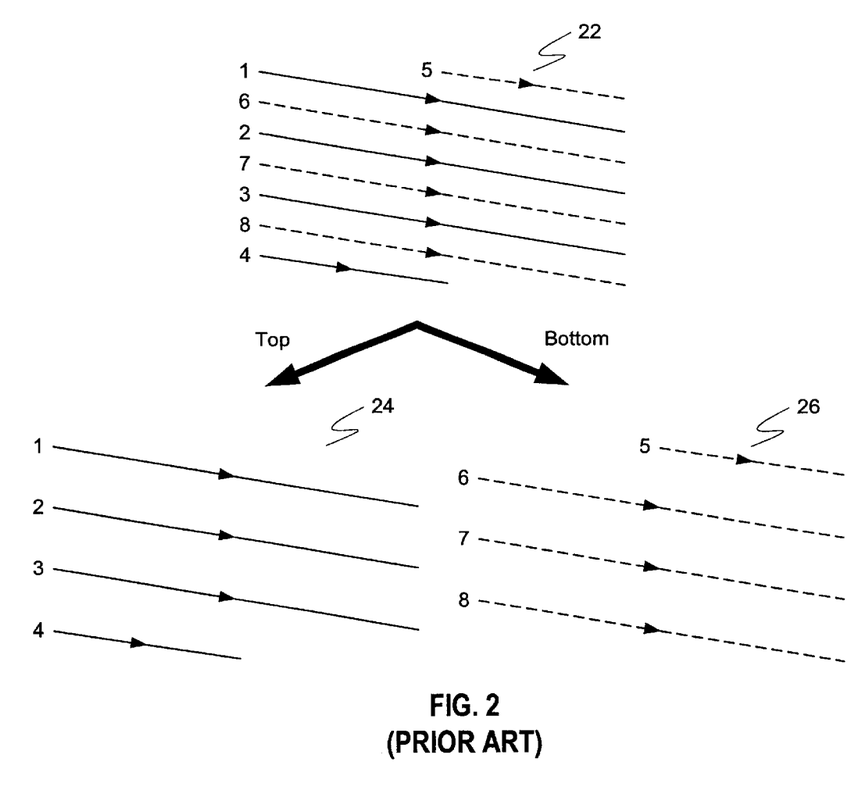
FIG. 2 illustrates an interlaced video scan pattern.

FIG. 2 illustrates an interlaced composition of frame 22. Like frame 20, six full-scan and two half-scan lines make up frame 22. Unlike frame 20, the scan lines are not gathered in one pass top to bottom. Instead, interlaced frame 22 gathers half the lines (lines 1–4) in a first pass top to bottom, and the other half (lines 5–8) in a second pass.

Each interlaced scan pass is called afield. Two adjacent-in-time fields 24 and 26 trace out every line in frame 22. These fields are commonly referred to as top and bottom. For purposes of this disclosure, the top field is defined to contain the topmost full scan line of the frame—generally, the naming convention is not important to system implementation.

If motion exists in an input scene, an interlaced frame 22 will not contain the same information as a progressive frame 20 gathered for the same input scene at the same frame rate. This fact is evident from a comparison of FIGS. 1 and 2. For example, scan line 1 is gathered first in FIG. 1; in FIG. 2, its corresponding scan line 5 is gathered fifth, or half a frame later. If the scene changes during this interval, the progressive and interlaced data will differ.

In some applications, it is desirable to convert interlaced video to progressive video. For example, some large-format video display devices use progressive format to enhance apparent picture quality, and some digital systems prefer non-interlaced image presentation. Typical interlace-to-progressive video conversion employs line doubling, where two adjacent progressive scan lines are output during a single interlaced video scan line period. The first of the two scan lines is taken from the top interlaced field, and the second is taken from the bottom interlaced field. This method doubles the frame rate of the progressive video, as compared to the frame rate of the interlaced video, although no additional information is added.

Figure 3:
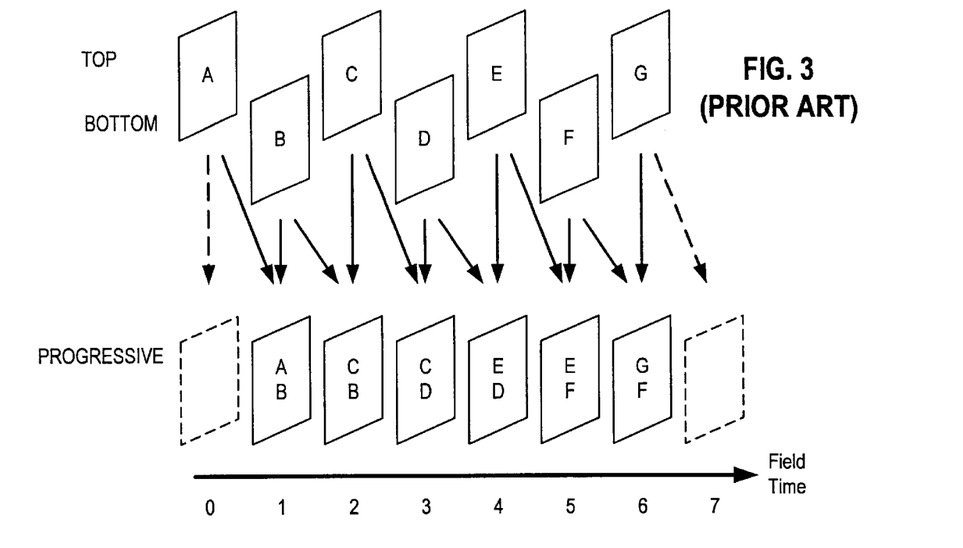
FIG. 3 depicts an interlaced-to-progressive video conversion sequence.

FIG. 3 depicts an interlaced to progressive conversion process. An interlace video sequence is shown having four top fields A, C, E, G and three bottom fields B, D, F. Each line-doubled progressive frame is created by combining a top field with an adjacent bottom field as shown in FIG. 3. For example, bottom field B is first combined with top field A to create progressive video frame AB. When top field C arrives, B may then be combined with C to create a second progressive video frame CB.

In order to create progressive video in this manner, one of the two fields always must be delayed by one field time in order to allow combination with the present field. Converter circuit 28 of FIG. 4 accomplishes this using a field store 32. Video input 30 is delayed in field store 32 for one field time, allowing each field in input 30 to be used during the generation of two consecutive progressive frames. A field sync line controls top switch 34 and bottom switch 36, such that a top field will always be routed to top field line store 38, and a bottom field will always be routed to bottom field line store 40. Line stores 38 and 40 are controlled by a line sync signal, such that line-doubled progressive video is output correctly.

Motion picture film and video are typically captured at different frame rates. Most motion picture film is captured at a frame exposure rate of 24 frames per second (i.e., a 24 Hz frame rate). In the United States, video typically uses a capture rate of 59.94 interlaced fields per second (for purposes of this disclosure, this rate is rounded and referred to as a 60 field-per-second rate, or a 60 Hz field rate). Since two interlaced fields are required to paint an entire frame, the frame rate of 60 Hz interlaced video is 30 Hz.

Because motion picture film and video frame rates differ, a motion picture film cannot be distributed by televised or recorded video without rate conversion. The most common method for converting 24 Hz frame rate motion picture film to 60 Hz field rate video is termed 3:2 pulldown.

Figure 5:
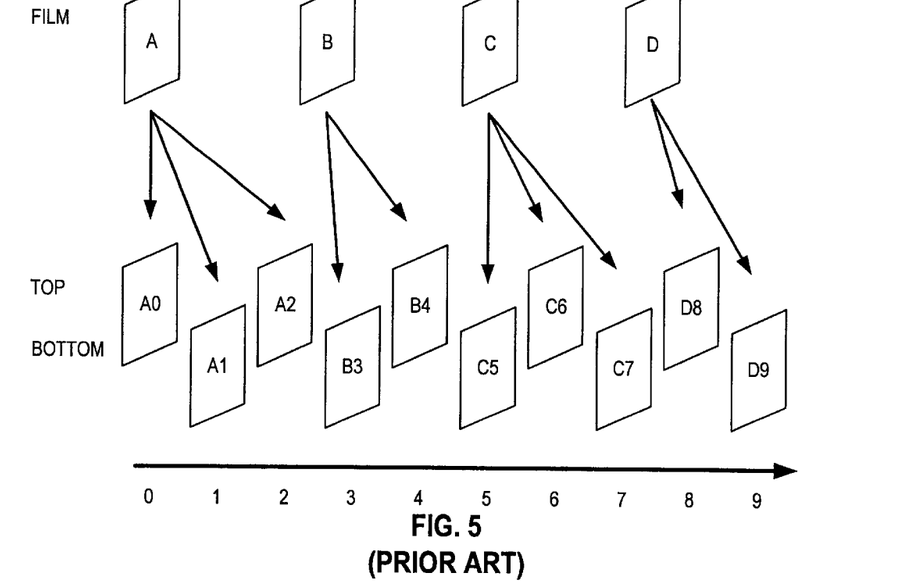
FIG. 5 depicts a film-to-3:2 pulldown interlaced video conversion sequence.

The basic concept of 3:2 pulldown is shown in FIG. 5. Half of the motion picture frames (e.g., frames A and C in FIG. 5) are transferred as three interlaced video fields, and half of the motion picture frames (e.g., frames B and D) are transferred as two interlaced video fields. Three and two field transfers are alternated, resulting in a 3, 2, 3, 2, 3, 2 pattern that transfers every two motion picture frames using five video fields. After four film frames (and ten video fields), the pulldown pattern repeats. Note that for film frame A, two top video fields and one bottom video field are produced, while for film frame C, two bottom video fields and one top video field are produced.

Figure 4:
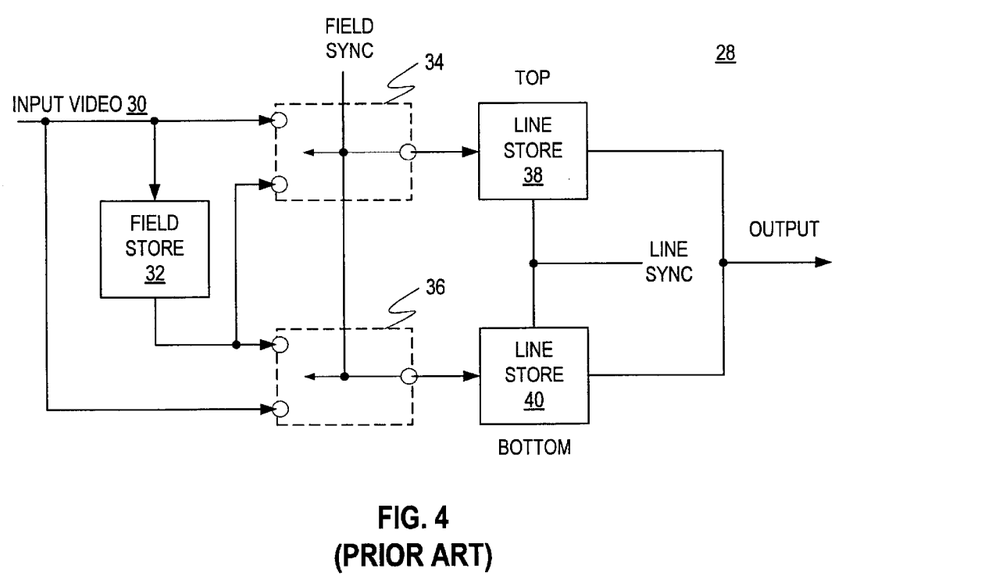
FIG. 4 shows a prior art interlaced-to-progressive video converter.
Figure 6:
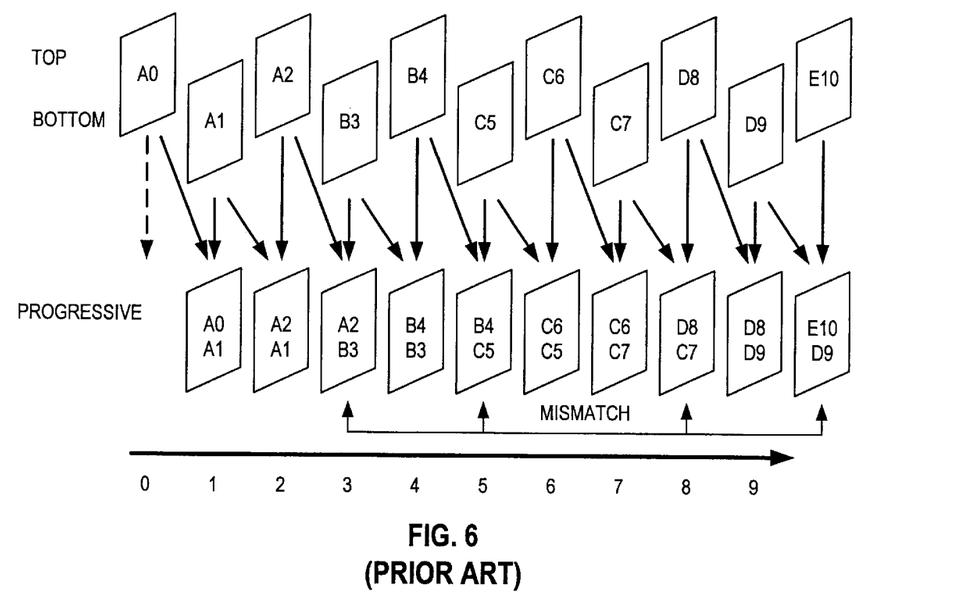
FIG. 6 depicts an uncompensated 3:2 pulldown-to-progressive video conversion sequence.

Interlace-to-progressive converter 28 of FIG. 4 produces conversion artifacts if the video signal presented to it is a 3:2 pulldown signal. FIG. 6 shows the 3:2 pulldown video pattern of FIG. 5, along with a progressive conversion produced by converter 28. In the pulldown video signal, motion between successive fields does not occur over $1/60^{th}$ of a second intervals like it does for conventional video. Instead, successive fields either have no motion (because they were created from the same film frame) or exhibit motion at the film frame rate of $1/24^{th}$ of a second. Mismatches in the progressive conversion of 3:2 pulldown occur when fields are combined that originated in separate film frames. In FIG. 6, these are identified as progressive frames A2/B3, B4/C5, D8/C7, and E10/D9. The frame mismatch produces undesirable conversion artifacts.

Figure 7:
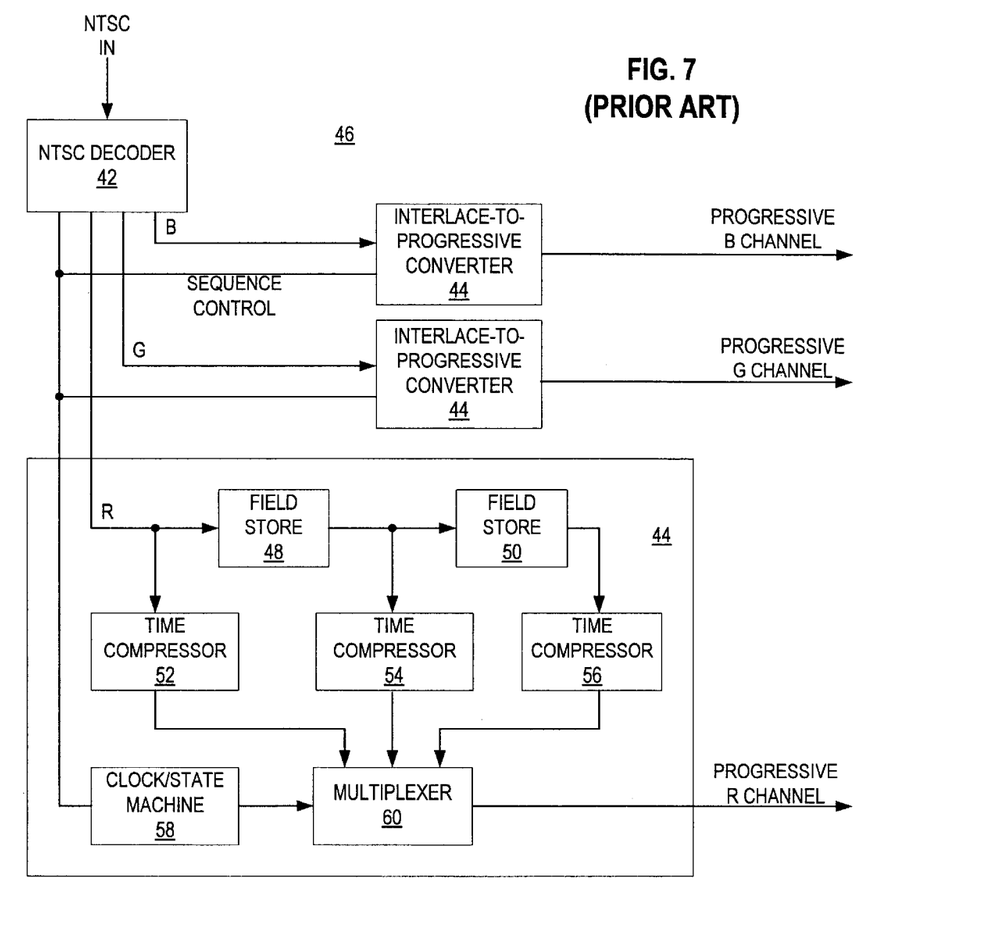
FIG. 7 shows a prior art 3:2 pulldown interlaced-to-progressive video converter.

Yves Faroudja recognized that by modifying an interlace-to-progressive video converter, the creation of these conversion artifacts could be avoided. In U.S. Pat. No. 4,876, 596, issued to Faroudja on Oct. 24, 1989, and entitled "Film-to-Video Converter With Scan Line Doubling", a system is disclosed that avoids the creation of motion artifacts during line doubling of 3:2 pulldown material. This system is shown in FIG. 7.

Faroudja envisioned a modified NTSC system that provided an indication of the presence of 3:2 pulldown material within the NTSC signal itself. In Faroujda's converter system 46, this modified NTSC video was fed to a specialized NTSC decoder 42 that produced red, green, and blue (R, G, and B) interlaced video channels, and a sequence control signal that indicated where in the processing of the ten-field repeating pattern of 3:2 pulldown the system currently was. Each of the RGB channels was fed to a separate interlace-to-progressive converter 44. Each converter 44 maintained copies of the two previous fields. By appropriate sequencing in multiplexer 60, the current field and the two previous fields were combined into a progressive frame at each field time.

Figure 8:
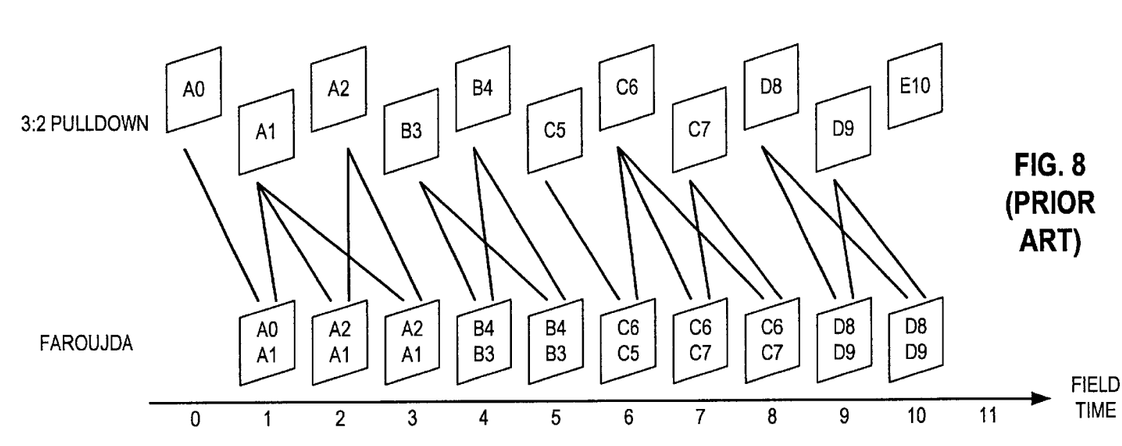
FIGS. 8 and 9 depict prior art 3:2 pulldown interlaced-to-progressive video conversion sequences.

FIG. 8 illustrates the conversion process disclosed in the '596 patent. At field time 1, top field A0 and bottom field A1 are combined to form a progressive frame A0/A1. At field time 2, top field A2 and bottom field A1 are combined to form a progressive frame A2/A1. These two steps are identical to normal progressive frame formation as shown in FIG. 3. But at frame time 3, instead of combining top field A2 with bottom field B3, the combination used in frame 2 is repeated. This requires converter 44's additional field store 50, which allows bottom field A2 to be delayed for an additional field time. The resulting progressive frame sequence contains no mismatched fields, and results in an improved picture quality for 3:2 pulldown video.

Figure 9:
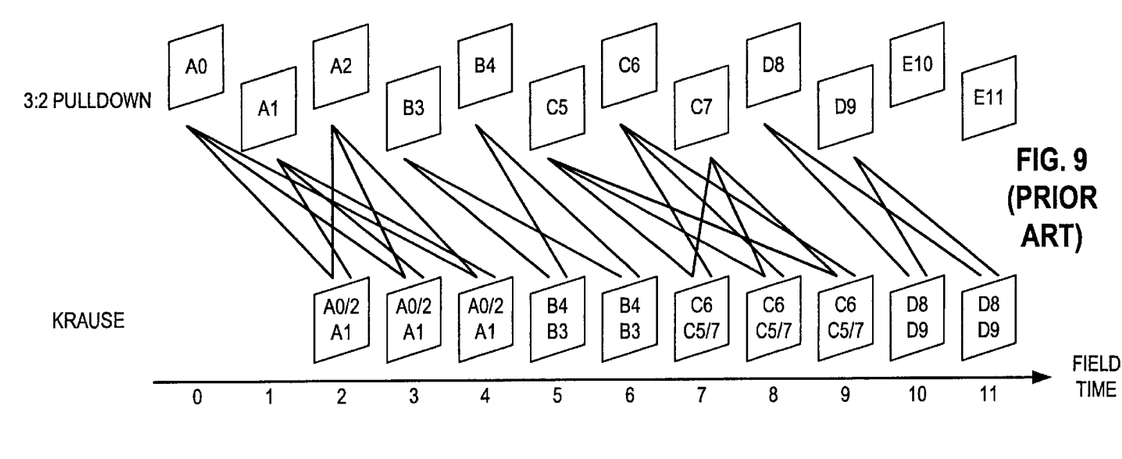

In U.S. Pat. No. 4,881,125, issued to Edward Krause on Nov. 14, 1989, and entitled "Progressive Scan Display of Video Derived From Film", a method for implementing a noise-averaging line-doubling system for 3:2 pulldown material was disclosed. The '125 method required a two-field delay, as illustrated in FIG. 9. By waiting two field times, this method allows all three "A" fields from the 3:2 pulldown video signal to be gathered. The method then averages the identical (except for noise) repeated top "A" fields A0 and A2 to obtain a 3 dB noise-reduced top field A0/2. Three identical progressive frames A0/2/A1 are then output at field times 2, 3, and 4. This method requires an additional field store and an averager for each channel, and introduces an extra field of delay as compared to the '596 patent. In return, a 3 dB noise reduction may be observed on half of the scan lines of the progressive video output, for three out of every five field times.

SUMMARY OF THE INVENTION

The present invention discloses a low-delay conversion of 3:2 pulldown video to progressive format with field averaging. The invention may be implemented with the same latency and field store requirements as the '596 patent. At the same time, the present invention takes advantage of redundant fields in 3:2 pulldown video in order to reduce noise.

Although not readily apparent on its face, the '125 patent requirement for two fields of delay during 3:2 pulldown processing is costly. One cost of two-field delay is the creation of noticeable delay artifacts during switching in and out of 3:2 pulldown processing mode. These delay artifacts are readily observable when viewing programming that contains a mixture of interlaced video and 3:2 pulldown material.

A second cost of two-field delay is that chroma signals must be delayed by two frames along with luma signals in order to avoid motion color artifacts. This requirement prevents a two-field delay system from being useful in a greatly simplified embodiment of the present invention, where only luma signals receive 3:2 pulldown processing. For example, an embodiment of the present invention using luma-only pulldown processing and normal progressive processing for two chroma channels requires a total of four field stores, one averager, and one pulldown multiplexer. If a similar system were implemented with two-field delay pulldown processing for luma an d both chroma channels, it would require nine field stores, three averagers, and three pulldown multiplexers.

It has been heretofore unrecognized that field averaging may be combined with minimum latency and field store requirements. The present invention combines these concepts by choosing not to create latency for the purpose of noise averaging. At the same time, the present invention provides for an averager that is conditionally tied to a field store, allowing averaged fields to persist longer than one field time. Using these concepts, the present invention averages repeated fields 40% of the time during 3:2 pulldown processing, as compared to 60% of the time for two-field delay processing.

In one aspect, the present invention provides for a video signal multiplexer having a send field output and a store field output. The multiplexer has a five-state pulldown operational mode that, for each of the five states, selects the send field output from among a first input field signal, a second input field signal, and a third input field signal that represents the average of said first and second input field signals, and selects the store field output from among the first input field signal and the third input field signal.

In another a spect, the present invention provides for an interlaced-to-progressive video scan converter having a video signal multiplexer like the one described above. This scan converter has a video signal input path connected to a first multiplexer input, a first field store connected to the multiplexer store field output, and a second field store connected to the output of the first field store. The second field store output is connected to a second multiplexer input. The second field store output and the video signal input path are both connected to a two-signal averager that averages the two signals and provides the average to a third multiplexer input. The converter provides an approximately one-field delayed progressive output, and averages two fields taken from the same motion picture frame when such is possible within the one-field time constraint.

In yet another aspect, the present invention discloses a method of converting 3:2 pulldown interlaced video to progressive video. The method considers 3:2 pulldown interlaced video that represents a four-frame motion picture film sequence as a ten-field interlaced video field sequence of three, two, three, two video fields per motion picture frame respectively for the four-frame sequence. One step of the method is the step of creating a ten-frame progressive video frame sequence, having a delay of approximately one field time with respect to the ten-field interlaced video sequence. This step is achieved by combining at one field time intervals a top field and a bottom field from the ten-field interlaced video sequence, where, at the time of combination, the top field and the bottom field are the most recently available top and bottom fields corresponding to the same motion picture film frame. The method comprises the further step of substituting, for the top field or the bottom field in the combining step, an average of that top or bottom field and the field two fields prior, when that top or bottom field and the field two fields prior correspond to the same motion picture film frame.

In a fourth aspect, the present invention discloses a multi-component signal interlaced-to-progressive video scan converter system for processing an interlaced-field luma component and at least one interlaced-field chroma component of a video signal. The system comprises a scan line doubler that produces a scan line-doubled chroma frame at each field time using the two most recently available fields of the interlaced-field chroma component. The system also comprises a 3:2 pulldown field multiplexer/averager that operates in a 3:2 pulldown mode to produce scan line-doubled luma frames that are delayed with respect to the interlaced-field luma component by approximately one field time. The system may further comprise a 3:2 pulldown video detector for the interlaced field luma component. The detector asserts a 3:2 pulldown enable signal to the 3:2 pulldown field multiplexer/averager when it detects the presence of 3:2 pulldown video.

BRIEF DESCRIPTION OF THE DRAWING

The invention may be best understood by reading the disclosure with reference to the drawing, wherein.

DETAILED DESCRIPTION OF THE PREFERRED EMBODIMENTS

The following preferred embodiments assume that an NTSC baseband video signal has been converted to YUV or YIQ three-channel format and digitally sampled. The present invention can, however, be used with any interlaced video signal, color space, format, or number of channels, and may also be implemented with either analog components or using a combination of analog and digital processing. Digital processing may take the form of in-line hardware components, or may use a software-configured digital signal processor that accomplishes the disclosed functions.

Figure 10:
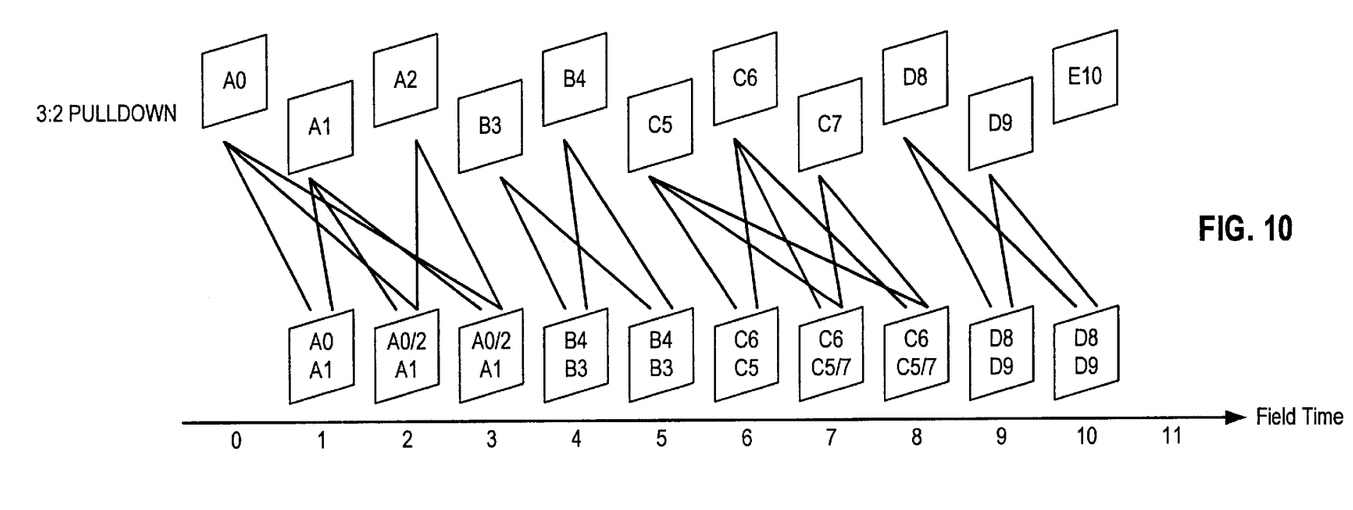
FIG. 10 depicts a 3:2 pulldown interlaced-to-progressive video conversion sequence according to an embodiment of the present invention.

The operational effects of the present invention can best be conceptualized by a comparison of its output with that of the prior art. FIGS. 8 and 9 show, respectively, 3:2 pulldown interlace-to-progressive video conversion in accordance with the '596 patent disclosure and in accordance with the '125 patent disclosure. FIG. 10 shows 3:2 pulldown interlace-to-progressive video for 3:2 pulldown interlace-to-progressive video conversion according to an embodiment of the present invention. FIG. 10 progressive video frames 1, 4, 5, 6, 9, and 10 are identical to the corresponding minimum-latency video frames of FIG. 8. FIG. 10 progressive video frames 2, 3, 7, and 8 are identical to the corresponding noise-reduced video frames of FIG. 9—but in the present invention, these frames are part of a single-field delay sequence instead of a two-field delay sequence. Thus the present invention uses minimum latency, and adds noise reduction when its usage will not incur a delay penalty. This provides both better latency performance than FIG. 9 and better noise performance than FIG. 8.

Figure 11:
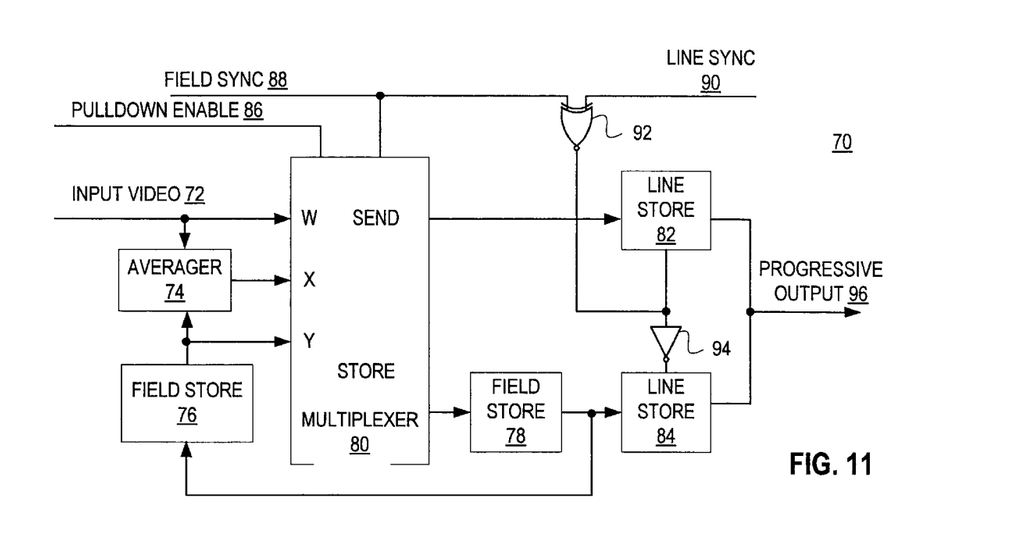
FIG. 11 shows an embodiment of a 3:2 pulldown interlaced-to-progressive video converter according to the present invention.

FIG. 11 illustrates one embodiment of an interlace-to-progressive video converter 70 according to the present invention. Central to this embodiment is a 3-to-2 multiplexer 80, which supplies two fields to a progressive output stage (line stores 82 and 84) according to the present invention. The three field inputs W, X, and Y of multiplexer 80 are connected respectively to an input video stream 72, a two-signal averager 74, and a field store 76. The multiplexer can select any one of these three field inputs for the SEND field output. The multiplexer can also select one of field inputs W and X for the STORE field output.

Field stores 76 and 78 are connected in series with the STORE field output of multiplexer 80. Field store 78 supplies a one-field-time delayed version of the STORE field output to line store 84. And field store 76 supplies a two-field-time delayed version of the STORE field output back to field input Y of multiplexer 80.

Field store 76's two-field-time delayed STORE field is supplied, along with input video stream 72, as inputs to two-signal averager 74. Two-signal averager 74 combines these two inputs, e.g., by summing the two field signals and dividing the result by two. In a digital implementation, where the two inputs are digital pixel data streams, pixels corresponding to the same field location in each input can be summed and then shifted right one bit, with or without rounding, to create the averaged signal supplied to field input X. The averager may be left running continuously, or it may be enabled by signal from the multiplexer during field times where the averager field input signal X is required.

Two control signals, pulldown enable 86 and field sync 88, control multiplexer operation. Field sync 88 signals multiplexer 80 as to the location of field boundaries in input video stream 72; multiplexer 80 uses this signal to time its input switching. Pulldown enable 86 signals multiplexer 80 as to whether normal video mode or 3:2 pulldown video mode is to be used.

Using these two signals, multiplexer 80 steps through a predetermined set of states to produce the appropriate progressive video output. The device asserting pulldown enable 86 should have knowledge regarding the initial state of multiplexer 80 after assertion, and should time assertion of pulldown enable 86 to align this state appropriately with the 3:2 pulldown material.

Figure 12:
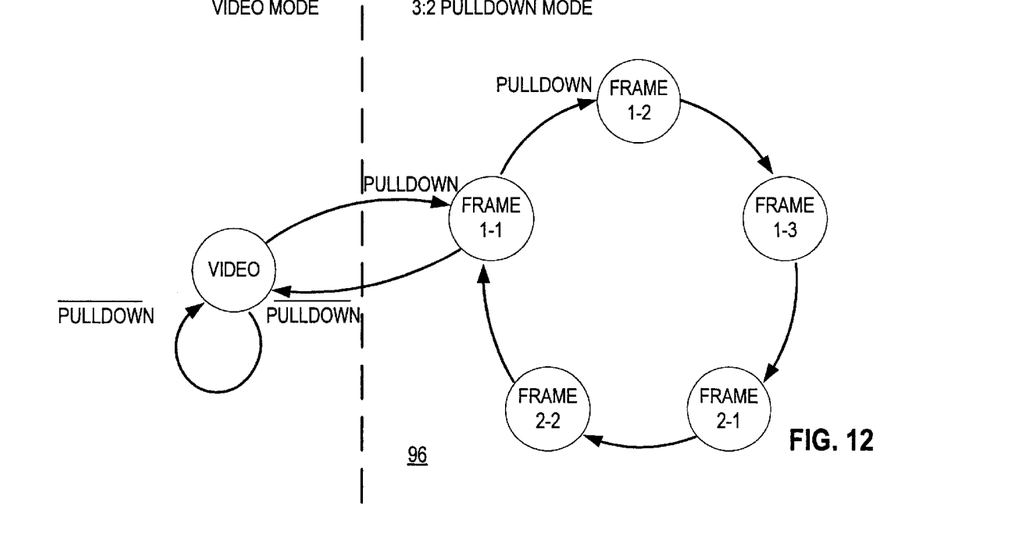
FIG. 12 shows a state transition diagram for a 3:2 pulldown interlaced-to-progressive video converter according to the present invention.

FIG. 12 shows a state transition diagram 96 for multiplexer 80. Pulldown state transition diagram 96 steps to its next state when it receives a field sync signal. The next state is based only on the current state and the value of pulldown enable 86. The multiplexer stays in "video mode" as long as pulldown enable 86 is deasserted. Upon assertion of pulldown enable 86, multiplexer 80 transitions to "3:2 pulldown mode". In this mode, the multiplexer steps through five states in a circular fashion. Each state corresponds to a field in a five-field 3:2 pulldown sequence taken from two motion picture film frames, where the first motion picture film frame is a three-field frame, and the second motion picture film frame is a two-field frame. Each state's name indicates its position in the sequence by the current field that should appear during that state. Note that multiplexer 80 will stay in 3:2 pulldown mode for a minimum of 6 field times with this state diagram.

Several variations on this basic state diagram are possible. Another good entry point is at the frame 2-1 state; although other entry points are possible, they may produce artifacts. Multiple exit points are also possible; again, the frame 2-1 state is a good alternate choice, and others may produce artifacts. It should also be noted that the state diagram may be converted to ten states, one for each field in the repeating 3:2 pulldown sequence. This is most useful if the multiplexer sorts its output into top and bottom fields, like the alternate embodiment of FIG. 15.

of line stores 82 and 84 and then the other of line stores 82 and 84 output their current lines during a single interlaced scan line time. Note that the "top" and "bottom" line stores alternate who goes first after each interlaced field boundary—by combining interlaced field sync signal 88 with line sync 90, XNOR gate 92 produces a clocking signal for line stores 82 and 84 that appropriately accounts for the location of the top field and bottom field data within the line stores.

Figure 13:
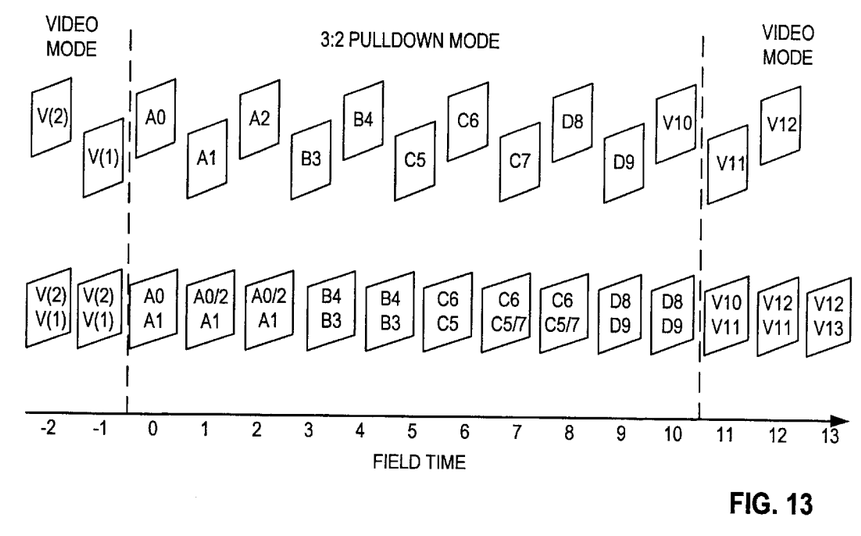
FIG. 13 depicts an interlace-to-progressive video conversion sequence achievable with the present invention under mode switching conditions.

FIG. 13 shows the operation of converter 70, using state transition model 96, for an interlaced input signal. At field time 0, pulldown enable 86 is asserted, placing multiplexer 86 in 3:2 pulldown mode. Between field times 6 and 9, pulldown enable 86 is deasserted. FIG. 13 shows how the progressive output frames transition at mode change. At the field time 0 transition, multiplexer 80 is in the frame 1-1 3:2 pulldown state, and thus it displays the last two video fields, V(2) and V(1), for an additional field time. At the field time 10 transition, multiplexer 80 is again in the frame 1-1 3:2 pulldown state, and displays the final progressive frame of film frame D. On transition back to video mode, field V10 has missed one field time of its display, but no other video fields are affected.

Table 1 summarizes field values appearing at several places in converter 70 during the switching operation of multiplexer 80, for the interlace field conversion sequence of FIG. 13. Note that the top field output corresponds alternately with either the send field output or field store 78's output, and the bottom field output follows the same correspondence with a one field-time offset.

TABLE 1

| Field Time | Mode | Store Field Output | | Send Field Output | | Field Store 78 | Top Field | Bottom Field |
|---|---|---|---|---|---|---|---|---|
| | | Input | Value | Input | Value | Output | Output | Output |
| −2 | Video | W | V(2) | W | V(2) | V(3) | V(2) | V(3) |
| −1 | Video | W | V(1) | W | V(1) | V(2) | V(2) | V(1) |
| 0 | 3:2 | W | A0 | Y | V(2) | V(1) | V(2) | V(1) |
| 1 | 3:2 | W | A1 | W | A1 | A0 | A0 | A1 |
| 2 | 3:2 | X | A0 + A2 | X | A0 + A2 | A1 | A0 + A2 | A1 |
| 3 | 3:2 | W | B3 | Y | A1 | A0 + A2 | A0 + A2 | A1 |
| 4 | 3:2 | W | B4 | W | B4 | B3 | B4 | B3 |
| 5 | 3:2 | W | C5 | Y | B3 | B4 | B4 | B3 |
| 6 | 3:2 | W | C6 | W | C6 | C5 | C6 | C5 |
| 7 | 3:2 | X | C5 + C7 | X | C5 + C7 | C6 | C6 | C5 + C7 |
| 8 | 3:2 | W | D8 | Y | C6 | C5 + C7 | C6 | C5 + C7 |
| 9 | 3:2 | W | D9 | W | D9 | D8 | D8 | D9 |
| 10 | 3:2 | W | V10 | Y | D8 | D9 | D8 | D9 |
| 11 | Video | W | V11 | W | V11 | V10 | V10 | V11 |
| 12 | Video | W | V12 | W | V12 | V11 | V12 | V11 |
| 13 | Video | W | V13 | W | V13 | V12 | V12 | V13 |
| 14 | Video | W | V14 | W | V14 | V13 | V14 | V13 |

For the embodiment of FIG. 11, multiplexer 80 does not keep track of whether the fields that it processes are "top" or "bottom" fields. Using the invention, multiplexer 80 should, however, always output two top fields or two bottom fields simultaneously on its SEND and STORE outputs. Since the STORE output is delayed one field time before passing to line store 84, one top field and one bottom field will always be presented to line stores 82 and 84.

Figure 14:
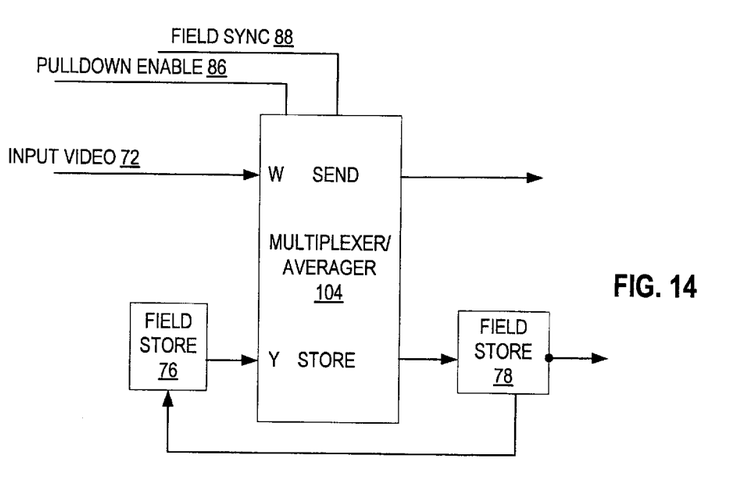
FIGS. 14 and 15 show alternative embodiments of a 3:2 pulldown interlaced-to-progressive video converter according to the present invention.

Line stores 82 and 84 alternate in putting a scan line out to progressive output 96. In order to accomplish this in real time, a scan line from each line store must be output during a single scan line time of the interlaced field input. Line sync signal 90 clocks at this line-doubled line rate, such that one Alternate Embodiments FIG. 14 shows a multiplexer/averager combination 104 that performs the equivalent functions of both multiplexer 80 and two-signal averager 74. In this embodiment, the "X" input is internalized. One advantage of multiplexer/averager 104 is that the averager can be directly controlled by the multiplexer and activated only when needed.

Figure 15:
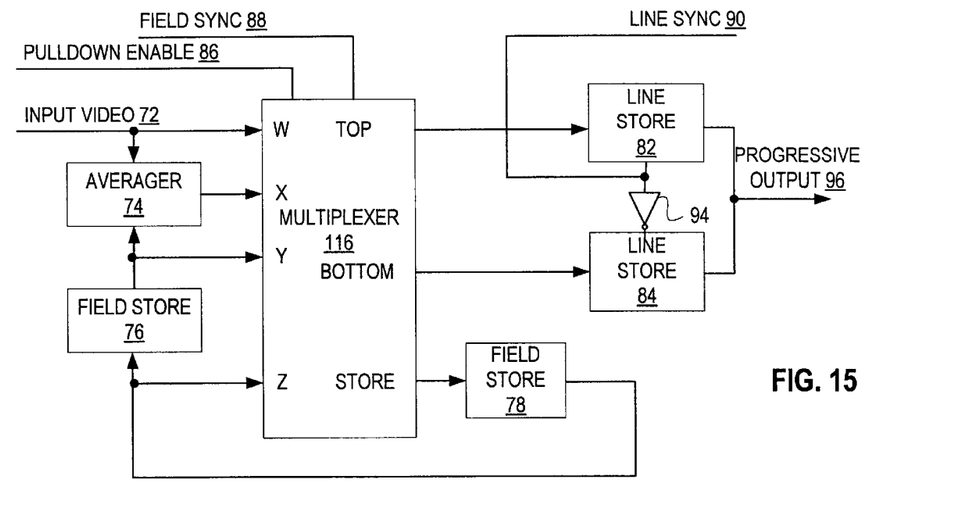

FIG. 15 shows an embodiment that internalizes, within multiplexer 116, the top and bottom field switching performed by XNOR gate 92 in FIG. 11. This is accomplished by feeding the output of field store 78 back to a fourth multiplexer field input Z. Input Z and the SEND output of multiplexer 80 are switched back and fourth between two outputs, TOP and BOTTOM. Line store 82 always receives a top field from multiplexer 116, and line store 84 always receives a bottom field.

A Partial 3:2 Pulldown Conversion System

One advantage of the present invention is that it can be used in a system that provides a 3:2 pulldown mode for only one portion of a composite video signal. Color video generally uses some "color space" representation, such as RGB, YIQ, or YUV. NTSC video uses either a YIQ or YUV representation, where Y is a luminance signal and I,Q or U,V are chrominance signals. Luminance (luma) is a combination of red, green, and blue that is matched to the human visual system to appear black and white, and is typically expressed as $$Y=0.299R+0.587G+0.114B$$

The luma component is allotted a wide bandwidth in the NTSC signal. The I,Q or U,V chroma components carry color information and are allotted a much smaller bandwidth. Because fine detail is carried primarily in the Y channel, a lower-complexity system may provide 3:2 pulldown conversion only for the Y channel, and always process the chroma components using conventional video scan line doubling.

Figure 16:
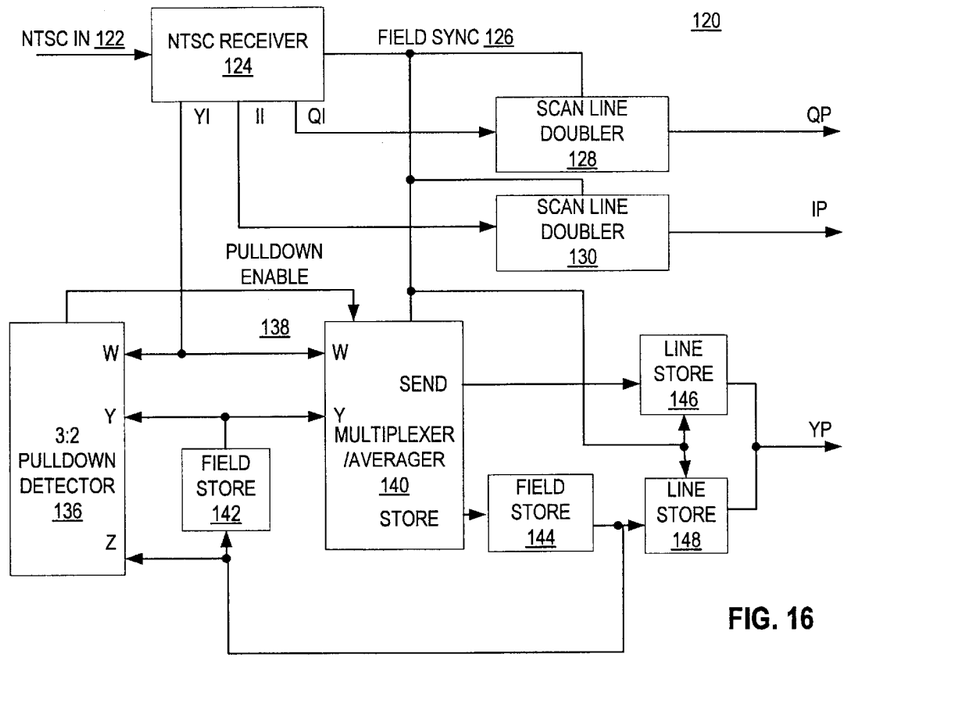
FIG. 16 shows a video scan converter system according to an embodiment of the present invention.

One partial pulldown processing system 120 is shown in FIG. 16. An NTSC input signal 122 is split by NTSC receiver 124 into three (preferably digitized) field components, $Y_I$, $I_I$, and $Q_I$. Chroma components $I_I$ and $Q_I$ are converted to progressive video components $I_P$ and $Q_P$ using scan line doublers 130 and 128 (see FIGS. 3 and 4 and their accompanying description). Luma component $Y_I$ is passed to multiplexer/averager 140 and 3:2 pulldown detector 136. Multiplexer/averager 140 operates in conjunction with field stores 142 and 144 and line stores 146 and 148 to produce a progressive video luma component $Y_P$ as shown and described in FIGS. 10–14 and the accompanying text (line store switching logic is not shown in FIG. 16 for readability).

Multiplexer/averager 140 has both a video mode and a 3:2 pulldown mode. In video mode, processing and timing of that processing are similar to that of scan line doublers 128 and 130. In 3:2 pulldown mode, multiplexer/averager 140 provides for a 3:2 pulldown-processed luma component $Y_P$ that is slightly lagging chroma components $I_P$ and $Q_P$. For most 3:2 pulldown material, this lag will be unnoticeable to a human observer.

Pulldown enable signal 138 is preferably provided by 3:2 pulldown detector 136. Detector 136 may use the $Y_I$ signal and its delayed versions produced by field stores 142 and 144 to detect the presence of 3:2 pulldown material. When 3:2 pulldown material is present, pulldown enable 138 can be asserted at an appropriate point in field processing to switch to 3:2 pulldown mode.

One preferred method of operation for pulldown detector 136 is disclosed in co-pending U.S. patent application Ser. No. 09/052,711, which is incorporated herein by reference. This application is entitled "System for Identifying Video Fields Generated from Film Sources", and was filed by Larry Westerman and Prasanna Modem on Mar. 30, 1998. It describes a detector that compares pixels from a field with those of a second preceding field, and counts the number of pixel differences passing a threshold. An adaptive sequence analyzer looks for a pattern in the difference counts, over a number of field times, that is indicative of 3:2 pulldown material. If a 3:2 pulldown pattern is found, the detector asserts the pulldown enable signal.

Figure 17:
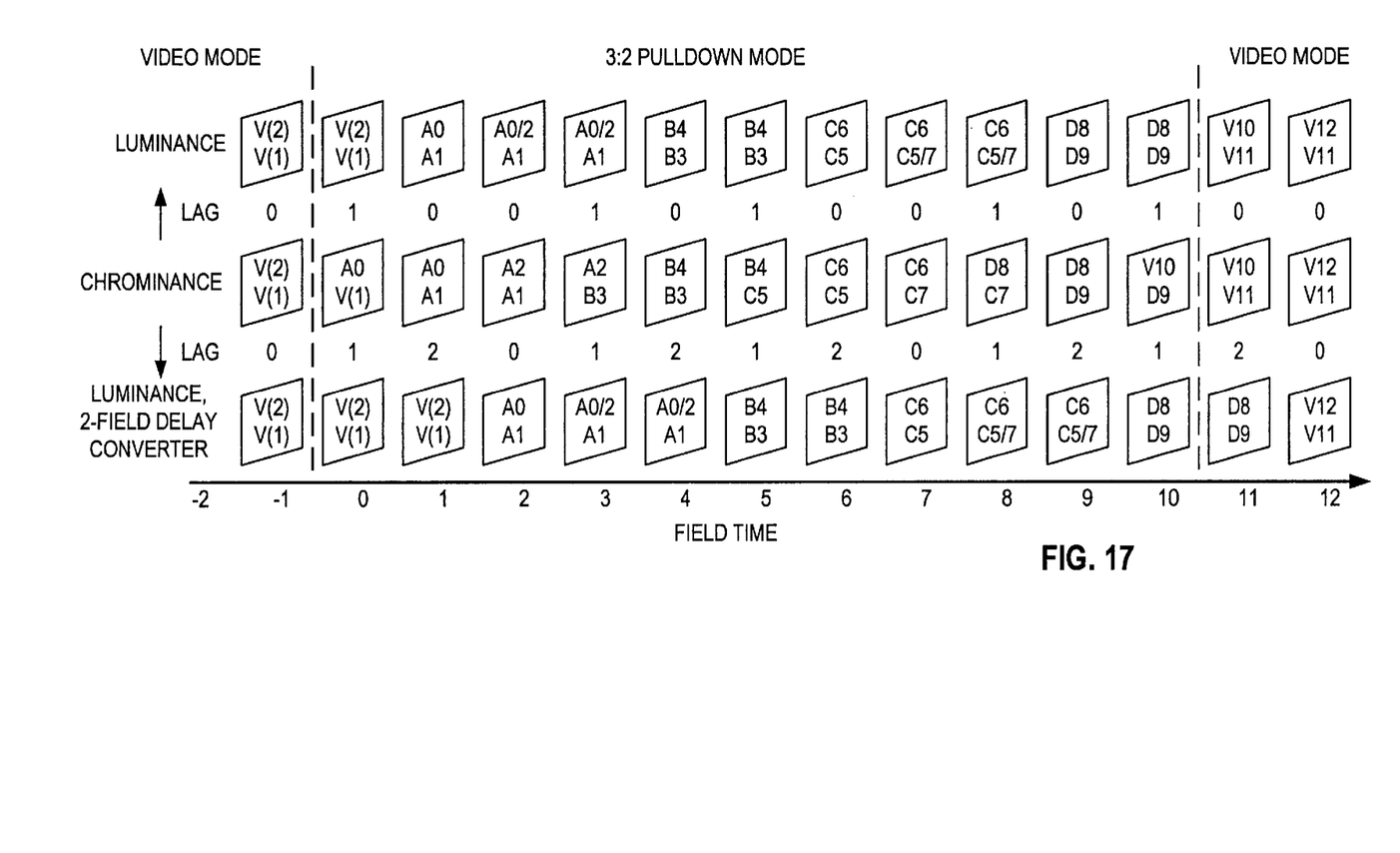
FIG. 17 compares luma/chroma field offsets for an embodiment of the present invention and a two-field delay converter.

FIG. 17 compares the progressive luminance and chrominance outputs of system 120 for the video/3:2 pulldown/video transitional sequence of FIG. 13. In 3:2 pulldown mode, at least one field used in each progressive luminance frame agrees with its corresponding field used in the progressive chrominance frames output at that field time. Both fields of the luminance frame agree with the fields of the chrominance frames 60% of the time. For the other 40% of the frames, the chrominance signal for half the lines in the frame may be slightly misregistered, with the degree of misregistration depending on the degree of motion present in the sequence.

FIG. 17 also compares the chrominance output timing with the luminance output timing of an averaging system that requires two fields of delay. For this combination, both fields agree only 20% of the time, one field agrees 40% of the time, and both fields are completely misregistered the remaining 40% of the time. This almost perpetual misregistration can create noticeable color artifacts for sequences with motion. These artifacts make such a system unacceptable.

A further disadvantage of a two-field-delay system is also evident from FIG. 17. During transitions between video and 3:2 mode, the two-field lag requires that at least one field be repeated for four consecutive field times, creating a "stop-start" artifact that is noticeable during the transition. A similar artifact may be created in the audio portion of the programming, or the audio may experience a noticeable offset during 3:2 pulldown processing with two-field delay.

Other Embodiments

Numerous variations on the disclosed embodiments are possible. For example, system 120 may contain a third scan line doubler arranged in parallel with multiplexer/averager 140. Pulldown enable 138 in such a system selects one of these parallel units to create $Y_P$, and disables the other one, based on 3:2 pulldown detection.

Figure 18:
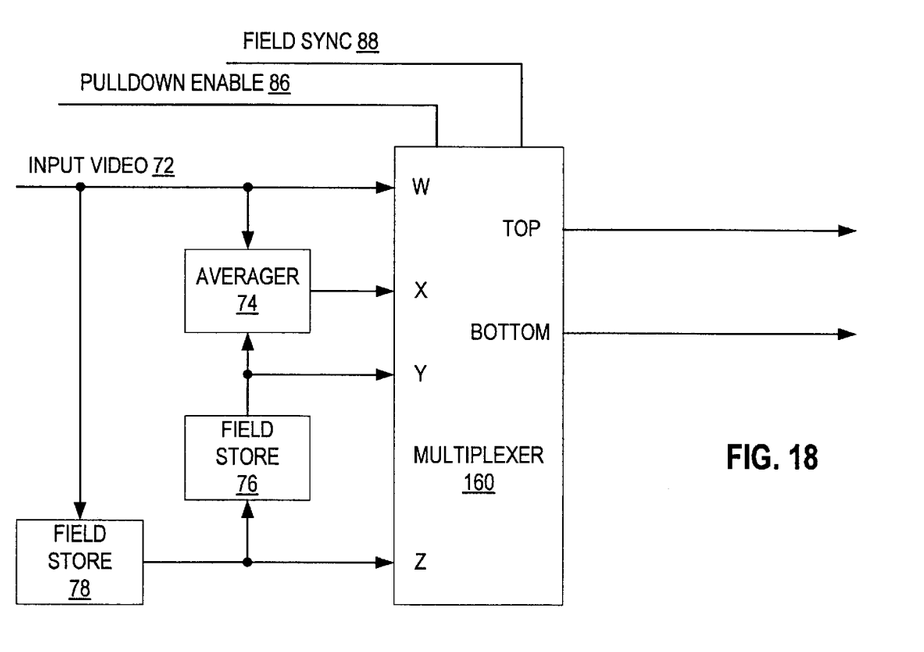
FIG. 18 shows a sub-optimal embodiment of a 3:2 pulldown interlaced-to-progressive video converter according to the present invention.

A suboptimal arrangement of a multiplexer 160, field stores 76 and 78, and a two-signal averager 74 is shown in FIG. 18. This embodiment has no STORE path out of multiplexer 160, and thus field store 78 is tied directly to input video signal 72. The disadvantage of this system is that it has no mechanism that stores a two-field average; since the average is only valid for one field time and does not persist, noise averaging can only be used on one out of five frames, instead of the two out of five frame noise averaging achievable when a STORE path is available.

After reading this disclosure, one of ordinary skill in the art will recognize that many other advantageous modifications to the disclosed embodiments are enabled by the concepts taught herein. For example, field stores 76 and 78 may be arranged in parallel, although this would require additional switching paths. Multiplexer 80 of FIG. 11 or multiplexer 104 of FIG. 12 may have conventional address lines, with mode control logic located separately. Other integration or discretization of the disclosed components is also possible. Such obvious modifications are intended to fall within the scope of the invention as claimed.

What is claimed is:

1. A video signal multiplexer having a send field output and a store field output, said multiplexer having a five-state pulldown operational mode that, for each of said five states, selects said send field output from among a first input field signal, a second input field signal, and a third input field signal that represents the average of said first and second input field signals, and selects said store field output from among said first input field signal and said third input field signal.

2. The video signal multiplexer of claim 1, further comprising a video operational mode that selects said first input field signal as both said send field output and said store field output, said multiplexer having a mode-switching input that switches it between said pulldown operational mode and said video operational mode.

3. The video signal multiplexer of claim 1, wherein in said five-state pulldown operational mode said multiplexer sequences repetitively through said five states in a circular sequence in response to a sequencing signal.

4. The video signal multiplexer of claim 3, wherein said five states correspond to 3:2 pulldown video field sequencing as first three-field state, second three-field state, third three-field state, first two-field state, and second two-field state, and wherein said multiplexer selects said send field output as said second, first, third, second, and first input field signals respectively for the five states.

5. The video signal multiplexer of claim 4, wherein said multiplexer selects said store field output as said first input signal in each of said states except said third three-field state, where said multiplexer selects said third input field signal instead.

6. The video signal multiplexer of claim 1, wherein said multiplexer further multiplexes said send field output and a one-field-time delayed version of said store field output onto a top field output and a bottom field output, by alternating at one-field time intervals said send field output between said top field output and said bottom field output and alternating said one-field-time delayed version of said store field output between the other of said top field and bottom field outputs.

7. The video signal multiplexer of claim 6, wherein said alternating output pattern is merged with said five states to create a ten-state pulldown operational mode.

8. The video signal multiplexer of claim 1, wherein said multiplexer further comprises a two-signal averager, and wherein said multiplexer creates said third input field signal internally by averaging said first and second input field signals using said two-signal averager.

9. An interlaced-to-progressive video scan converter comprising:
a video signal multiplexer having a send field output, a store field output, and first, second, and third multiplexer inputs, said multiplexer having a five-state pulldown operational mode that, for each of said five states, selects said send field output from among said multiplexer inputs, and selects said store field output from among said first and third multiplexer inputs;
a video signal input path connected to said first multiplexer input;
a first field store having a first storage input, connected to said multiplexer store field output, and a first storage output;
a second field store having a second storage input, connected to said first storage output, and a second storage output connected to said second multiplexer input; and
a two-signal averager having a first averager input connected to said video signal input path and a second averager input connected to said second storage output, said two-signal averager having an averager output connected to said third multiplexer input.

10. The video scan converter of claim 9, further comprising a first line store, a second line store, and line store sequencing logic, wherein said first line store receives input from said multiplexer send field output, said second line store receives input from said first storage output, said first and second line stores share a common output channel, and said line store sequencing logic controls sequencing between said first and second line stores onto said common output channel.

11. The video scan converter of claim 9, further comprising a first line store and a second line store, and wherein said multiplexer further comprises line store sequencing logic that selects, from among said send field output and said first storage output, the output corresponding to a top field and supplies that output to said first line store, and selects the other of said send field output and said first storage output and supplies that output to said second line store.

12. The video scan converter of claim 9, wherein said two-signal averager is an integral part of said multiplexer, and wherein said multiplexer creates said third multiplexer input internally by averaging said first and second input field signals using said two-signal averager.

13. The video scan converter of claim 12, wherein said two-signal averager is enabled by said multiplexer only when said third multiplexer input is needed for output.

14. A method of converting 3:2 pulldown interlaced video to progressive video, wherein said 3:2 pulldown interlaced video represents a four-frame motion picture film sequence as a ten-field interlaced video field sequence of three, two, three, two video fields per motion picture frame respectively for the four-frame sequence, said method comprising the steps of:
creating a ten-frame progressive video frame sequence, having a delay of approximately one field time with respect to said ten-field interlaced video sequence, by combining at one field time intervals a top field and a bottom field from said ten-field interlaced video sequence, where, at the time of combination, said top field and said bottom field are the most recently available top and bottom fields corresponding to the same motion picture film frame; and
substituting, for said top field or said bottom field in said combining step, an average of that top or bottom field and the field two fields prior, when that top or bottom field and the field two fields prior correspond to the same motion picture film frame.

15. A multi-component signal interlaced-to-progressive video scan converter system for processing an interlaced-field luma component and at least one interlaced-field chroma component of a video signal, said scan converter comprising:
a scan line doubler that produces a scan line-doubled progressive chroma frame at each field time using the two most recently available fields of said interlaced-field chroma component; and
a 3:2 pulldown field multiplexer/averager that operates in a 3:2 pulldown mode to produce scan line-doubled progressive luma frames that are delayed with respect to said interlaced-field luma component by approximately one field time.

16. The video scan converter system of claim 15, further comprising a 3:2 pulldown video detector for said interlaced field luma component, said 3:2 pulldown video detector asserting a 3:2 pulldown enable signal to said 3:2 pulldown field multiplexer/averager when it detects the presence of 3:2 pulldown video.

17. The video scan converter system of claim 16, further comprising first and second serially-connected luma-component field stores shared by said multiplexer/averager and said 3:2 pulldown video detector.

18. The video scan converter system of claim 16, wherein said 3:2 pulldown field multiplexer/averager also operates in a video mode that produces scan line-doubled luma frames that are field-synchronized with said scan line-doubled chroma frames, and wherein said multiplexer/averager switches between said 3:2 pulldown mode and said video mode in response to assertion and deassertion of said 3:2 pulldown enable signal.

19. The video scan converter system of claim 16, further comprising a second scan-line doubler connected to said interlaced-field luma component in parallel with said 3:2 pulldown field multiplexer/averager, wherein said 3:2 pulldown enable signal enables line-doubled luma frame output from said 3:2 pulldown field multiplexer/averager when asserted, and enables line-doubled luma frame output from said second scan-line doubler when deasserted.

* * * * *